US012801160B2

(12) United States Patent
Kuramitsu et al.

(10) Patent No.: US 12,801,160 B2
(45) Date of Patent: Nov. 17, 2026

(54) SPEED CONTROL FOR MOBILE OBJECTS

(71) Applicant: HONDA MOTOR CO., LTD., Tokyo (JP)

(72) Inventors: Yunosuke Kuramitsu, Wako (JP); Takashi Matsumoto, Wako (JP); Hideki Matsunaga, Wako (JP); Ryoji Wakayama, Wako (JP); Koki Aizawa, Wako (JP); Kento Shirakata, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 5 days.

(21) Appl. No.: 18/850,220

(22) PCT Filed: Mar. 30, 2022

(86) PCT No.: PCT/JP2022/015921
§ 371 (c)(1),
(2) Date: Sep. 24, 2024

(87) PCT Pub. No.: WO2023/188090
PCT Pub. Date: Oct. 5, 2023

(65) Prior Publication Data
US 2025/0216864 A1 Jul. 3, 2025

(51) Int. Cl.
*G05D 1/65* (2024.01)
*B60W 30/14* (2006.01)
(Continued)

(52) U.S. Cl.
CPC ............. *G05D 1/65* (2024.01); *B60W 30/146* (2013.01); *B60W 2552/00* (2020.02);
(Continued)

(58) Field of Classification Search
CPC .. G05D 1/65; G05D 2105/22; G05D 2105/28; G05D 2105/25; G05D 2107/13;
(Continued)

(56) References Cited

U.S. PATENT DOCUMENTS

| | | | | |
|---|---|---|---|---|
| 9,616,747 | B1 * | 4/2017 | Breed | B60W 30/146 |
| 10,410,516 | B1 * | 9/2019 | Andersson | H04W 4/40 |

(Continued)

FOREIGN PATENT DOCUMENTS

| | | |
|---|---|---|
| EP | 2969634 | 3/2020 |
| JP | 2017-072550 | 4/2017 |

(Continued)

OTHER PUBLICATIONS

International Search Report and Written Opinion for International Application No. PCT/JP2022/015921 mailed on Jun. 14, 2022, 8 pages.

(Continued)

*Primary Examiner* — David P. Merlino
(74) *Attorney, Agent, or Firm* — Amin, Turocy & Watson, LLP

(57) ABSTRACT

A mobile object control device for controlling a mobile object capable of moving both on a roadway and in a predetermined region different from the roadway includes a road type recognition unit configured to recognize whether the mobile object is moving on the roadway or in the predetermined region on the basis of an output of an external environment detection device configured to detect an external situation of the mobile object and a control unit configured to limit a speed of a case where the mobile object moves on the roadway to a first speed and limit a speed of a case where the mobile object moves in the predetermined region to a second speed lower than the first speed. The
(Continued)

control unit adjusts the first speed on the basis of a width of a course along which the mobile object moves.

5 Claims, 8 Drawing Sheets

(51) Int. Cl.
*G05D 105/22* (2024.01)
*G05D 105/28* (2024.01)
*G05D 107/13* (2024.01)
*G05D 107/17* (2024.01)

(52) U.S. Cl.
CPC ..... *B60W 2720/10* (2013.01); *G05D 2105/22* (2024.01); *G05D 2105/28* (2024.01); *G05D 2107/13* (2024.01); *G05D 2107/17* (2024.01)

(58) Field of Classification Search
CPC ........... G05D 2107/17; G05D 2111/10; G05D 1/243; G05D 1/617; G05D 2109/10; B60W 30/146; B60W 2552/00; B60W 2720/10; B60W 40/02; B60W 40/105
See application file for complete search history.

(56) References Cited

U.S. PATENT DOCUMENTS

| | | | | |
|---|---|---|---|---|
| 2013/0226431 | A1 | 8/2013 | Lu et al. | |
| 2015/0258893 | A1* | 9/2015 | Gray | B60W 30/146 701/93 |
| 2016/0031444 | A1* | 2/2016 | Fairgrieve | B60W 40/04 701/93 |
| 2017/0116485 | A1 | 4/2017 | Mullen | |
| 2017/0124880 | A1 | 5/2017 | Tateishi et al. | |
| 2018/0001887 | A1* | 1/2018 | Watanabe | B60G 17/01908 |
| 2018/0273031 | A1 | 9/2018 | Fujita et al. | |
| 2019/0383627 | A1* | 12/2019 | Nangeroni | B60W 50/0098 |
| 2020/0250975 | A1 | 8/2020 | Tang et al. | |
| 2021/0108926 | A1 | 4/2021 | Tran | |
| 2021/0221394 | A1* | 7/2021 | Uenoyama | B60W 40/09 |
| 2021/0390857 | A1 | 12/2021 | Uenoyama et al. | |
| 2022/0076037 | A1 | 3/2022 | Hochman et al. | |
| 2022/0141450 | A1 | 5/2022 | Pieper et al. | |
| 2022/0396147 | A1* | 12/2022 | Jeong | B60K 31/0008 |
| 2023/0245223 | A1* | 8/2023 | Okai | G06Q 30/0261 705/307 |
| 2023/0294694 | A1 | 9/2023 | Oshita et al. | |
| 2025/0216864 | A1 | 7/2025 | Kuramitsu et al. | |

FOREIGN PATENT DOCUMENTS

| | | |
|---|---|---|
| JP | 2017-100490 | 6/2017 |
| JP | 6477903 | 3/2019 |
| JP | 2019-079241 | 5/2019 |
| JP | 2019-190975 | 10/2019 |
| JP | 2020-086995 | 6/2020 |
| JP | 2020-168953 | 10/2020 |
| JP | 2020-197387 | 12/2020 |
| JP | 2021-133889 | 9/2021 |
| JP | 2021-196978 | 12/2021 |
| JP | 2022-507077 | 1/2022 |
| WO | 2017/217936 | 12/2017 |
| WO | 2019/216386 | 11/2019 |

OTHER PUBLICATIONS

European Search Report for European Patent Application No. 22935236.4 mailed Apr. 7, 2025.
International Search Report and Written Opinion for International Application No. PCT/JP2022/014909 mailed on Jun. 14, 2022, 9 pages.
European Search Report for European Patent Application No. 22935034.3 mailed Apr. 30, 2025.
Non-Final Office Action for U.S. Appl. No. 18/850,085 mailed Apr. 14, 2026.

* cited by examiner

FIG. 7

| W | ΔV1-1 |
|---|---|
| LESS THAN 2.5[m] | -5[km/h] |
| 2.5~3[m] | -3[km/h] |
| 3~3.5[m] | -2[km/h] |
| 3.5[m] OR MORE | 0 |

FIG. 8

| Sc | ΔV1-2 |
|---|---|
| 60~70 | -4[km/h] |
| 70~80 | -2[km/h] |
| 80~90 | -1[km/h] |
| 90 OR MORE | 0 |

SPEED CONTROL FOR MOBILE OBJECTS

TECHNICAL FIELD

The present invention relates to a mobile object control device, a mobile object control method, and a storage medium.

BACKGROUND ART

Conventionally, practical applications have been made for mobile objects capable of moving on both a sidewalk and a roadway and it is necessary to set different upper limit speeds for the sidewalk and the roadway for such mobile objects. In this regard, as disclosed in a related document, in the speed control of an electric wheelchair, an upper limit speed value is set in accordance with a width of a road and the upper limit speed value is reduced when movement on the edge of a road without a sidewalk is further detected (Patent Document 1).

CITATION LIST

Patent Document

Patent Document 1

Japanese Unexamined Patent Application, First Publication No. 2017-100490

SUMMARY OF INVENTION

Technical Problem

An electric wheelchair moves exclusively on a sidewalk. In conventional technology, it may not be possible to appropriately perform speed control in a mobile object capable of moving on a roadway and in a predetermined region different from the roadway.

The present invention has been made in consideration of such circumstances and an objective of the present invention is to provide a mobile object control device, a mobile object control method, and a storage medium for enabling speed control in a mobile object capable of moving on a roadway or in a predetermined region different from the roadway to be appropriately performed.

Solution to Problem

A mobile object control device, a mobile object control method, and a storage medium according to the present invention adopt the following configurations.

(1): According to an aspect of the present invention, there is provided a mobile object control device for controlling a mobile object capable of moving both on a roadway and in a predetermined region different from the roadway, the mobile object control device including: a road type recognition unit configured to recognize whether the mobile object is moving on the roadway or in the predetermined region on the basis of an output of an external environment detection device configured to detect an external situation of the mobile object; and a control unit configured to limit a speed of a case where the mobile object moves on the roadway to a first speed and limit a speed of a case where the mobile object moves in the predetermined region to a second speed lower than the first speed, wherein the control unit adjusts the first speed on the basis of a width of a course along which the mobile object moves.

(2): In the above-described aspect (1), the road type recognition unit recognizes whether the mobile object is moving on the roadway or in the predetermined region on the basis of a roadway score indicating a probability of the mobile object moving on the roadway calculated on the basis of the output of the external environment detection device, and the control unit adjusts the first speed on the basis of the roadway score.

(3): In the above-described aspect (2), the control unit sets the first speed to a higher speed when the roadway score is higher.

(4): In the above-described aspect (2) or (3), the control unit compares an adjustment quantity of the first speed based on the width of the course with an adjustment quantity of the first speed based on the roadway score, adjusts the first speed on the basis of the width of the course when the adjustment quantity of the first speed based on the width of the course is greater than an adjustment quantity of the first speed based on the roadway score, and adjusts the first speed on the basis of the roadway score when the adjustment quantity of the first speed based on the width of the course is less than or equal to the adjustment quantity of the first speed based on the roadway score.

(5): According to another aspect of the present invention, there is provided a mobile object control method including: recognizing, by a computer for controlling a mobile object capable of moving both on a roadway and in a predetermined region different from the roadway, whether the mobile object is moving on the roadway or in the predetermined region on the basis of an output of an external environment detection device configured to detect an external situation of the mobile object; and limiting, by the computer, a speed of a case where the mobile object moves on the roadway to a first speed and limiting a speed of a case where the mobile object moves in the predetermined region to a second speed lower than the first speed, wherein limiting the speed of the case where the mobile object moves on the roadway to the first speed includes adjusting the first speed on the basis of a width of a course along which the mobile object moves.

(6): According to yet another aspect of the present invention, there is provided a storage medium storing a program for causing a computer for controlling a mobile object capable of moving both on a roadway and in a predetermined region different from the roadway to: recognize whether the mobile object is moving on the roadway or in the predetermined region on the basis of an output of an external environment detection device configured to detect an external situation of the mobile object; and limit a speed of a case where the mobile object moves on the roadway to a first speed and limit a speed of a case where the mobile object moves in the predetermined region to a second speed lower than the first speed, wherein limiting the speed of the case where the mobile object moves on the roadway to the first speed includes adjusting the first speed on the basis of a width of a course along which the mobile object moves.

Advantageous Effects of Invention

According to the above-described aspects (1) to (6), it is possible to appropriately perform speed control in a mobile object capable of moving on a roadway or in a predetermined region different from the roadway.

BRIEF DESCRIPTION OF DRAWINGS

FIG. 7 is a diagram showing an example of a relationship between a width W of a course and a correction value ΔV1-1.

FIG. 8 is a diagram showing an example of a relationship between a roadway score Sc and a correction value ΔV1-2.

DESCRIPTION OF EMBODIMENTS

Hereinafter, embodiments of a mobile object control device, a mobile object control method, and a program according to the present invention will be described with reference to the drawings. A mobile object moves both on a roadway and in a predetermined region different from the roadway. The mobile object may be referred to as micromobility. An electric kickboard is a type of micromobility. Moreover, the mobile object may be a vehicle that an occupant can board or may be an autonomous mobile object capable of performing unmanned autonomous movement. The autonomous mobile object is used, for example, for an application to transport cargo or the like. The predetermined region is, for example, a sidewalk. Moreover, the predetermined region may be a part or all of a roadside strip, a bicycle lane, a public open space, or the like or may include all sidewalks, roadside strips, bicycle lanes, public open spaces, and the like. In the following description, it is assumed that the predetermined region is a sidewalk. In the following description, a part described as the "sidewalk" can be read as the "predetermined region" as appropriate.

Figure 1:
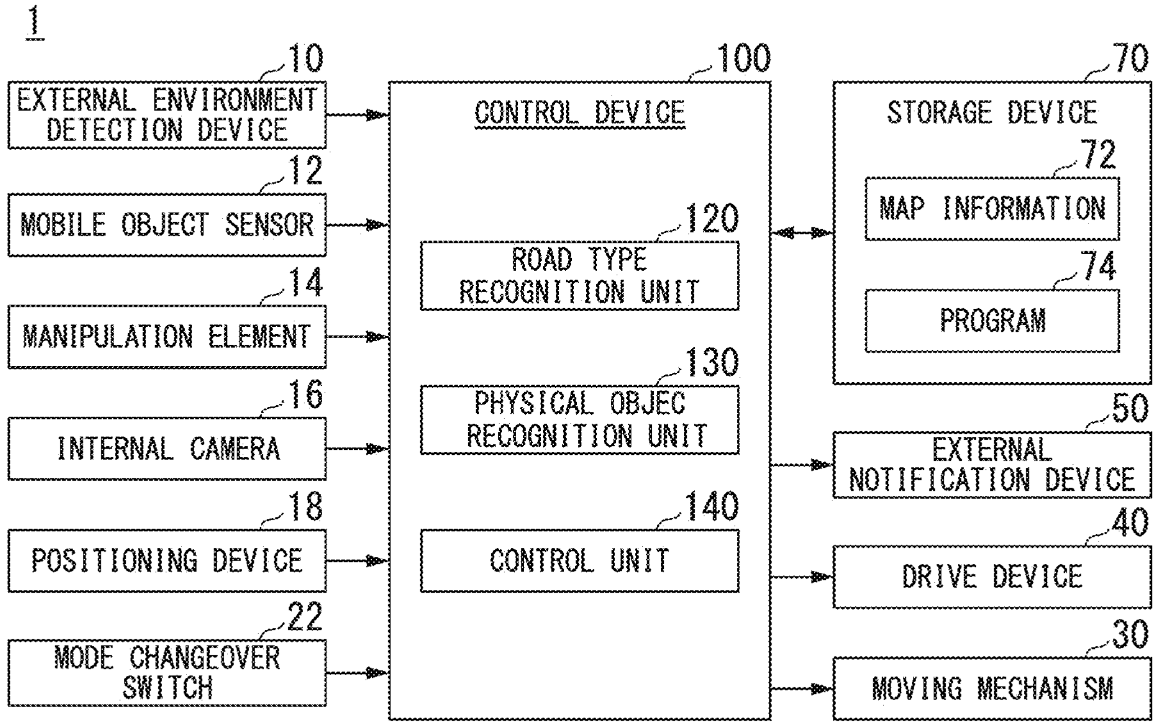
FIG. 1 is a diagram showing an example of a configuration of a mobile object and a control device according to an embodiment.

FIG. 1 is a diagram showing an example of a configuration of the mobile object 1 and the control device 100 according to the embodiment. The mobile object 1 includes, for example, an external environment detection device 10, a mobile object sensor 12, a manipulation element 14, an internal camera 16, a positioning device 18, a mode changeover switch 22, a moving mechanism 30, a drive device 40, an external notification device 50, a storage device 70, and a control device 100. Also, some constituent elements not essential for implementing the functions of the present invention may be omitted.

The external environment detection device 10 includes various types of devices in which a movement direction of the mobile object 1 is designated as a detection range. The external environment detection device 10 includes an external camera, a radar device, a light detection and ranging (LIDAR) sensor, a sensor fusion device, and the like. The external environment detection device 10 outputs information indicating a detection result (an image, a position of a physical object, or the like) to the control device 100.

The mobile object sensor 12 includes, for example, a speed sensor, an acceleration sensor, a yaw rate (angular velocity) sensor, an orientation sensor, a manipulation quantity detection sensor attached to the manipulation element 14, and the like. The manipulation element 14 includes, for example, a manipulation element for issuing an acceleration/deceleration instruction (for example, an accelerator pedal or a brake pedal) and a manipulation element for issuing a steering instruction (for example, a steering wheel). In this case, the mobile object sensor 12 may include an accelerator opening degree sensor, a brake depression amount sensor, a steering torque sensor, and the like. The mobile object 1 may include another type of manipulation element other than the above manipulation elements (for example, a non-annular rotation manipulation element, a joystick, a button, or the like) as the manipulation element 14.

The internal camera 16 images at least a head of the occupant of the mobile object 1 from the front. The internal camera 16 is a digital camera that uses an imaging element such as a charge-coupled device (CCD) or a complementary metal oxide semiconductor (CMOS). The internal camera 16 outputs a captured image to the control device 100.

The positioning device 18 is a device for measuring a position of the mobile object 1. The positioning device 18 is, for example, a global navigation satellite system (GNSS) receiver, and identifies the position of the mobile object 1 on the basis of a signal received from a GNSS satellite and outputs the identified position as position information. Also, the position information of the mobile object 1 may be estimated from a position of a Wi-Fi base station to which a communication device to be described below is connected.

The mode changeover switch 22 is a switch to be manipulated by the occupant. The mode changeover switch 22 may be a mechanical switch or a graphical user interface (GUI) switch set on the touch panel. The mode changeover switch 22 receives a manipulation for switching a driving mode to any one of, for example, mode A that is an assist mode in which one of the steering manipulation and acceleration/deceleration control is performed by the occupant and the other is performed automatically and that may be mode A-1 in which the steering manipulation is performed by the occupant and the acceleration/deceleration control is performed automatically or mode A-2 in which an acceleration/deceleration manipulation is performed by the occupant and the steering control is performed automatically, mode B that is a manual driving mode in which the steering manipulation and the acceleration/deceleration manipulation are performed by the occupant, and mode C that is an automated driving mode in which the steering control and the acceleration/deceleration control are performed automatically.

The moving mechanism 30 is a mechanism for moving the mobile object 1 on the road. The moving mechanism 30 is, for example, a wheel group that includes a steered wheel and a driven wheel. Moreover, the moving mechanism 30 may be a leg unit for multi-legged walking.

The drive device 40 outputs a force to the moving mechanism 30 so that the mobile object 1 can be moved. For example, the drive device 40 includes a motor that drives the driven wheel, a battery that stores electric power to be supplied to the motor, a steering device that adjusts the steering angle of the steered wheel, and the like. The drive device 40 may include an internal combustion engine, a fuel cell, or the like as a driving force output means or an electric power generation means. Moreover, the drive device 40 may further include a braking device using a friction force or air resistance.

The external notification device 50 is, for example, a lamp, a display device, a speaker, or the like provided on an outer plate portion of the mobile object 1 and configured to provide a notification of information to the outside of the mobile object 1. The external notification device 50 performs different operations in a state in which the mobile object 1 is moving on the sidewalk and a state in which the mobile object 1 is moving on the roadway. For example, the external notification device 50 is controlled so that light of the lamp is emitted when the mobile object 1 is moving on the sidewalk and light of the lamp is not emitted when the mobile object 1 is moving on the roadway. The color of the light emitted by this lamp is preferably a color specified by law. The external notification device 50 may be controlled so that the light of the lamp is emitted in green when the mobile object 1 is moving on the sidewalk and the light of the lamp is emitted in blue when the mobile object 1 is moving on the roadway. When the external notification device 50 is a display device, the external notification device 50 displays text or a graphic indicating "moving on the sidewalk" when the mobile object 1 is moving on the sidewalk.

Figure 2:
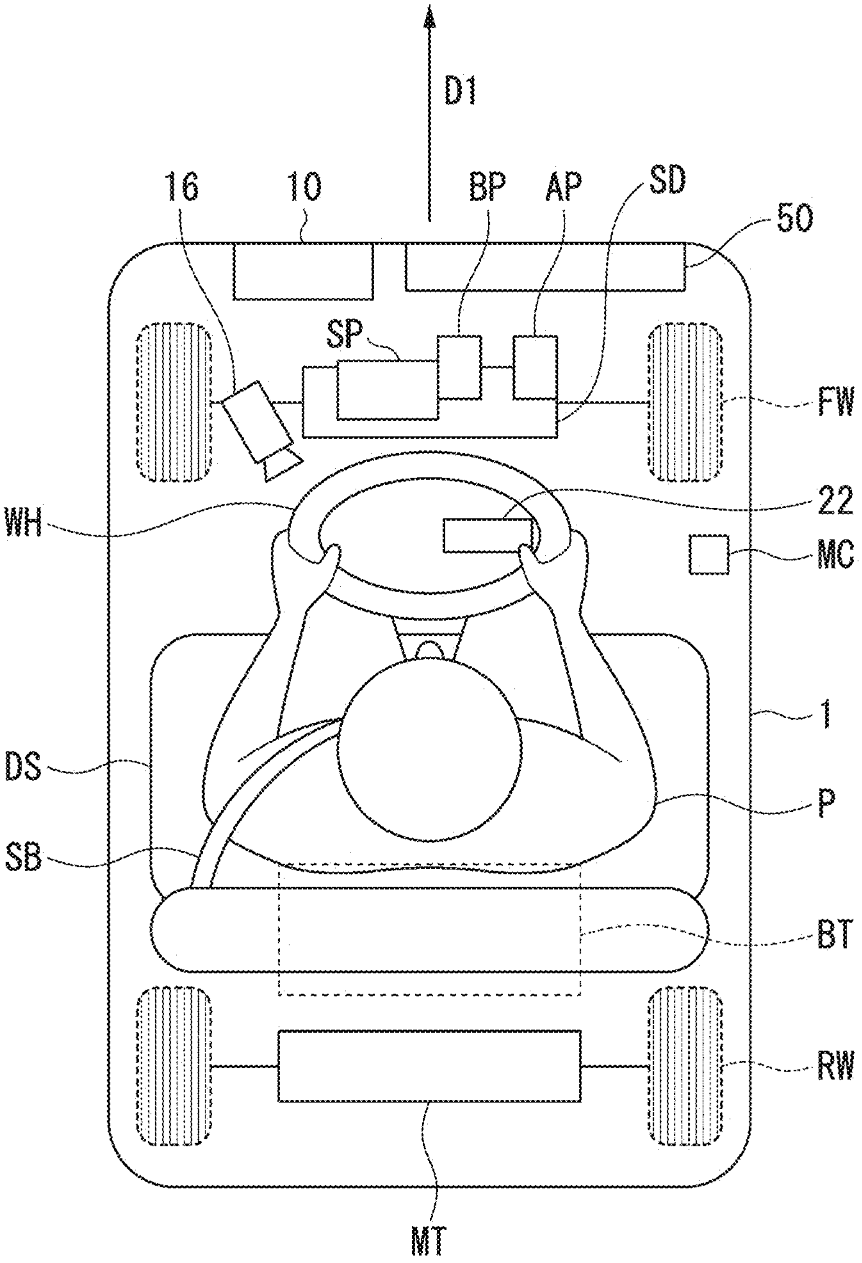
FIG. 2 is a perspective view of the mobile object viewed from above.

FIG. 2 is a perspective view of the mobile object 1 viewed from above. In FIG. 2, FW denotes the steered wheel, RW denotes the driven wheel, SD denotes the steering device, MT denotes the motor, and BT denotes the battery. The steering device SD, the motor MT, and the battery BT are included in the drive device 40. Moreover, AP denotes the accelerator pedal, BP denotes the brake pedal, WH denotes the steering wheel, SP denotes the speaker, and MC denotes a microphone. The mobile object 1 shown in FIG. 2 is a single-seater mobile object and an occupant Pis seated in the driver's seat DS and wearing a seat belt SB. An arrow D1 indicates a movement direction (a speed vector) of the mobile object 1. The external environment detection device 10 is provided near a front end of the mobile object 1, the internal camera 16 is provided at a position where the head of the occupant P can be imaged from the front of the occupant P, and the mode changeover switch 22 is provided on a boss portion of the steering wheel WH. Moreover, the external notification device 50 serving as a display device is provided near the front end of the mobile object 1.

Returning to FIG. 1, the storage device 70 is, for example, a non-transitory storage device such as a hard disk drive (HDD), a flash memory, or a random-access memory (RAM). The storage device 70 stores map information 72, a program 74 to be executed by the control device 100, and the like. Although the storage device 70 is shown outside a frame of the control device 100 in FIG. 1, the storage device 70 may be included in the control device 100. Moreover, the storage device 70 may be provided on a server (not shown).

[Control Device]

The control device 100 includes, for example, a road type recognition unit 120, a physical object recognition unit 130, and a control unit 140. These constituent elements are implemented, for example, by a hardware processor such as a central processing unit (CPU) executing a program (software) 74. Also, some or all of these constituent elements may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in the storage device 70 or may be stored in a removable storage medium (a non-transitory storage medium) such as a DVD or a CD-ROM and installed in the storage device 70 when the storage medium is mounted in a drive device.

The road type recognition unit 120 recognizes whether the mobile object 1 is moving on the roadway or the sidewalk. For example, the road type recognition unit 120 recognizes whether the mobile object 1 is moving on the roadway or the sidewalk by analyzing an image captured by the external camera of the external environment detection device 10. Also, the output of a radar device, a LIDAR sensor, a sensor fusion device, or the like may be used in an auxiliary way.

The road type recognition unit 120 adds a point value to a roadway score Sr every time each of the plurality of first events indicating that the mobile object 1 is moving on the roadway is recognized in the image captured by the external camera, and recognizes that the mobile object 1 is moving on the roadway when the roadway score Sr is greater than or equal to a first threshold value. In this case, the road type recognition unit 120 weights a point value in accordance with a degree of confidence when each of the plurality of first events has been recognized and adds the weighted point value to the roadway score Sr. Point values corresponding to the first events are denoted by P1 to Pn (n is a natural number and is equal to the number of events assumed as the first event). The point values P1 to Pn may be the same value or may be different values according to types of first events. Moreover, it is assumed that the weight corresponding to the degree of confidence of a recognition process is al to an. The degree of confidence of the recognition process is incidentally output in the process of recognizing the first event (including, for example, a discrimination process using a trained model by machine learning). The roadway score Sr is expressed by Eq. (1).

$$Sr = \alpha 1 \times P1 + \alpha 1 + P2 + \ldots + \alpha n \times Pn \quad (1)$$

(If the corresponding first event k is not recognized, Pk=0 (k=1 to n))

Here, when the road type recognition unit 120 has recognized any one of a plurality of second events indicating that the mobile object 1 is moving on the sidewalk in the image captured by the external camera, it is recognized that the mobile object 1 is moving on the sidewalk regardless of the roadway score Sr.

More specifically, first, the road type recognition unit 120 classifies and labels pixels within a frame of the image according to semantic segmentation and assumes a plurality of virtual division regions and their boundary lines. The road type recognition unit 120 performs at least a process of classifying the region of the image captured by the external camera into a region where the mobile object 1 is located (hereinafter referred to as a host region) and a region where the mobile object 1 is not located adjacent to the region (hereinafter referred to as an adjacent region).

Figure 3:
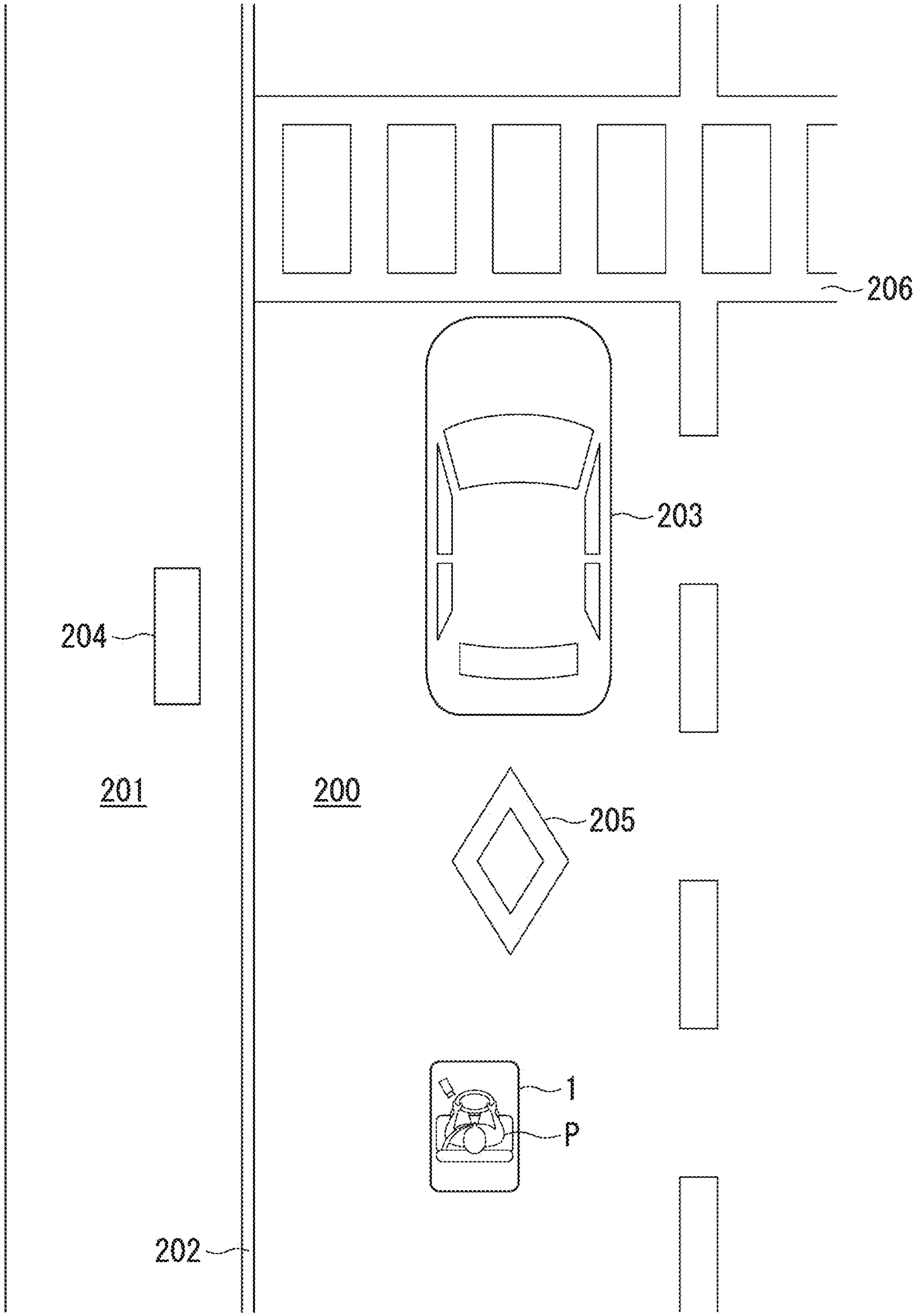
FIG. 3 is a diagram showing a plurality of first events.
Figure 4:
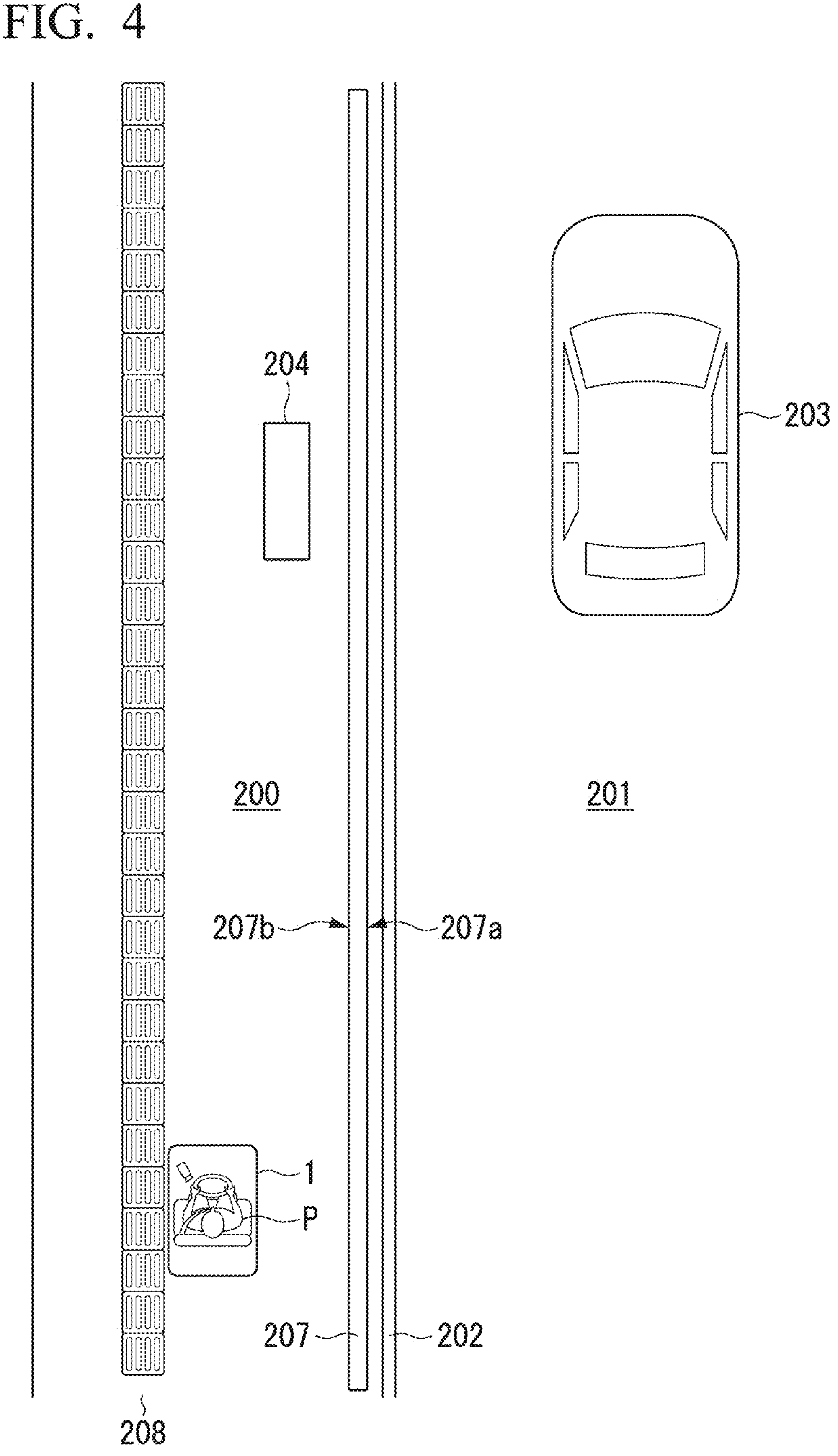
FIG. 4 is a diagram showing a plurality of second events.

FIG. 3 is a diagram showing a plurality of first events. Although FIGS. 3 and 4 are represented by bird's-eye views viewed from above for description, a process of the road type recognition unit 120 may be performed on an image plane. As shown in FIG. 3, the first events include, for example, two or more events among event (A) in which there is no static obstacle 204 other than a vehicle 203 in a host region 200 (i.e., inside the outer edge of the region where the mobile object 1 is located), event (B) in which the vehicle 203 is moving in the host region 200, event (C) in which there is a road surface marking 205 on a road surface of the host region 200, event (D) in which there is a crosswalk 206 in the host region 200, and event (E) in which the host region 200 is located on a lower side with respect to a step 202. Static obstacles are, for example, standing signboards, mailboxes, telephone poles, garbage bins, and the like, which are not classified as mobile objects or traffic participants. Because the static obstacles are rarely placed on the roadway in general, the road type recognition unit 120 increases a value of the roadway score when there is no static obstacle 204 in its host region 200. Moreover, because a region where the vehicle 203 is moving is a roadway with a high probability, the road type recognition unit 120 increases the value of the roadway score when the vehicle 203 is moving in the host region 200. Moreover, because the road surface marking 205 is generally drawn on the roadway, the road type recognition unit 120 increases the value of the roadway score when the road surface marking 205 is located in the host region 200. Moreover, because the crosswalk 206 is generally drawn on the roadway, the road type recognition unit 120 increases the value of the roadway score when the crosswalk 206 is located in the host region 200. Moreover, because the sidewalk is generally located on the upper side of the step with respect to the roadway, the road type recognition unit 120 increases the value of the roadway score when the host region 200 is located on the lower side with respect to the step 202.

FIG. 4 is a diagram showing a plurality of second events. In FIG. 4, a relationship between a host region 200 and an adjacent region 201 is reversed according to a position of the mobile object 1. As shown in FIG. 4, the second events include, for example, two or more events among event (a) in which a second surface 207*b* facing the sidewalk side between two surfaces of a guardrail 207 has been imaged by the external camera, event (b) in which a braille block 208 is located on the road surface of the host region 200, event (c) in which there is a static obstacle 204 other than the vehicle 203 in the host region 200, and event (d) in which the host region 200 is located on the upper side with respect to the step 202. The guardrail 207 includes a first surface 207*a* facing the roadway side and a second surface 207*b* facing the sidewalk side and is installed on the road to match its direction. When the second surface 207*b* is imaged by the external camera, it is inferred that the mobile object 1 is moving on the sidewalk with a high probability. Moreover, in general, braille blocks are laid only on sidewalks. The static obstacle 204 and the step 202 are as described in the first event.

Figure 5:
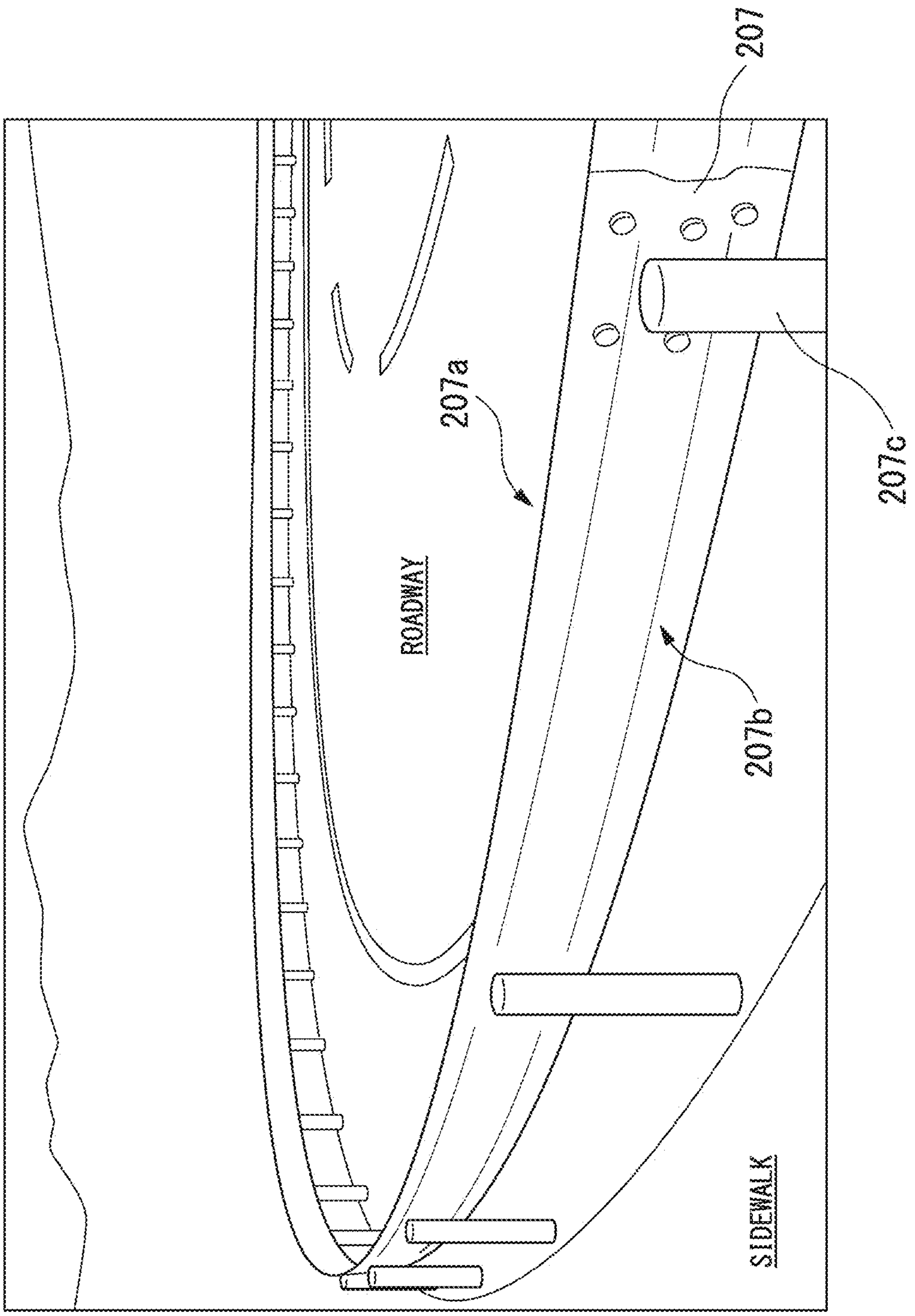
FIG. 5 is a diagram showing a second surface 207*b* facing a sidewalk side of a guardrail 207.

FIG. 5 is a diagram showing the second surface 207*b* facing the sidewalk side of the guardrail 207. As shown in FIG. 5, it is characterized that the second surface 207*b* has supports 207*c* on a front side compared to the first surface and is formed so that it is bent in the order of recess→projection→recess in a downward direction from the upper end. For example, the second surface 207*b* can be trained by a trained model and discriminated by image analysis.

In this way, it is possible to appropriately recognize whether the mobile object 1 is moving on the roadway or in a predetermined region different from the roadway by designating the first event as a factor for increasing the roadway score Sr and recognizing that the mobile object 1 is moving on the roadway when the roadway score Sr is greater than or equal to a first threshold value Th1 and the second event is not recognized. As will be described below, the mobile object 1 is permitted to move at a higher speed when the mobile object 1 moves on the roadway than when the mobile object 1 moves on the sidewalk. Therefore, conditions for recognizing that the mobile object 1 is moving on the roadway are preferably set conservatively compared with conditions for recognizing that the mobile object 1 is moving on the sidewalk in consideration of safety aspects. In this regard, according to the embodiment, the validity of a recognition result can be ensured by designating the first event as a condition for increasing a point value instead of a condition for immediately recognizing the region as a roadway and designating the second event as a condition for immediately recognizing the region as a sidewalk.

The road type recognition unit 120 may collate position information of the mobile object 1 with the map information 72 and recognize whether the mobile object 1 is moving on the roadway or the sidewalk. In this case, the map information needs to be accurate enough to distinguish the sidewalk and the roadway from position coordinates. Moreover, when the "predetermined region" is not only a sidewalk, the road type recognition unit 120 also performs similar processes for roadside strips, bicycle lanes, public open spaces, and the like.

Figure 6:
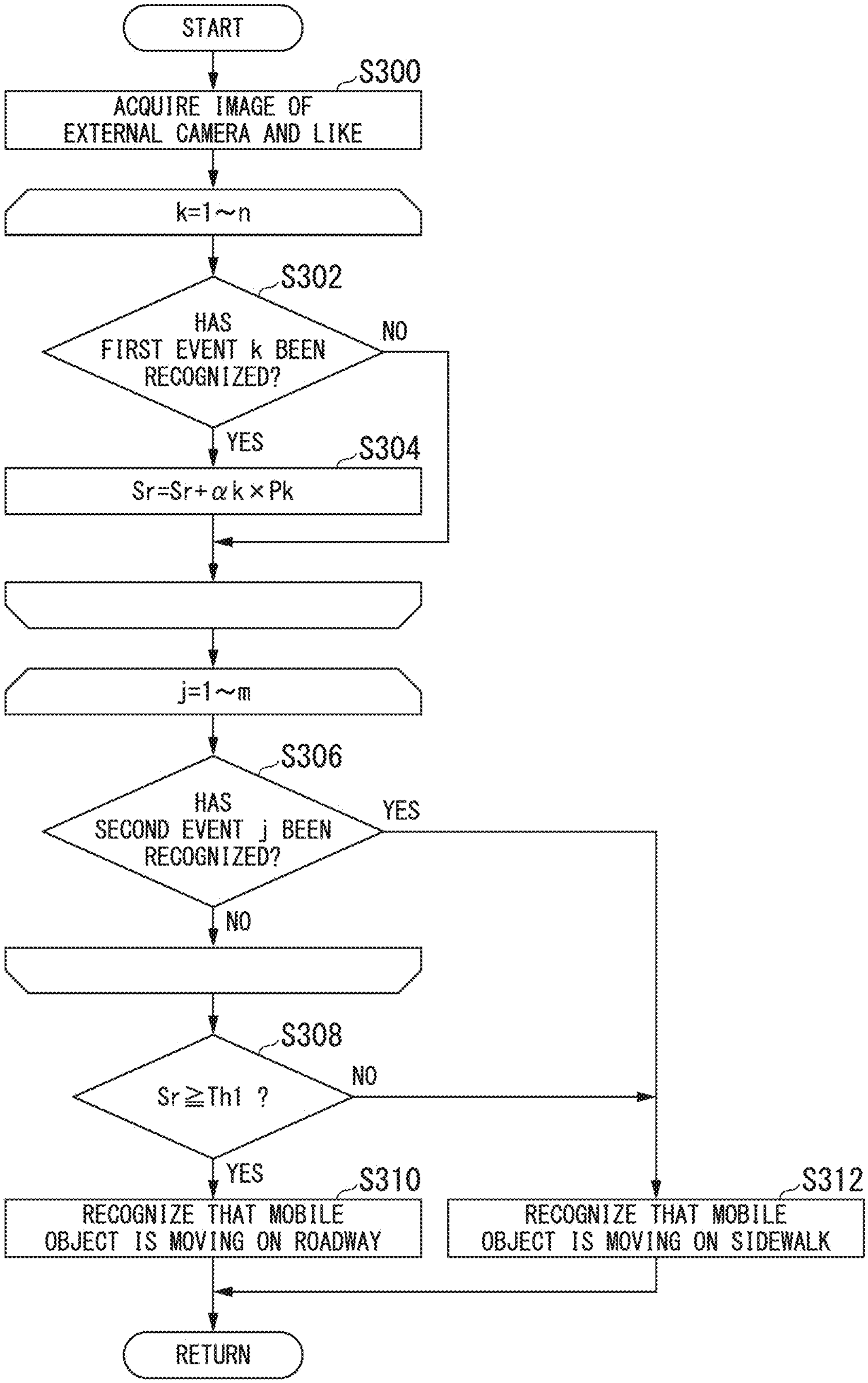
FIG. 6 is a flowchart showing an example of a flow of a process executed by a road type recognition unit 120 of the embodiment.

FIG. 6 is a flowchart showing an example of a flow of a process executed by the road type recognition unit 120 of the embodiment. First, the road type recognition unit 120 acquires information for recognition, such as an image of the external camera (step S300).

Subsequently, the road type recognition unit 120 performs the processing of steps S302 and S304 for each of first events k (k=1 to n). The argument k is identification information of the first event. The road type recognition unit 120 determines whether or not first event k has been recognized (step S302) and a product of a coefficient ak and a point value Pk is added to the roadway score Sr when first event k has been recognized (step S304).

Subsequently, the road type recognition unit 120 determines whether or not second event j has been recognized for each of second events j (j=1 to m) (step S306). The argument j is identification information of the second event and m is a natural number.

When a positive determination result has been obtained even once in the determination processing of step S306 performed up to m times, the road type recognition unit 120 recognizes that the mobile object 1 is moving on the sidewalk (step S312).

When a negative determination result has been obtained in all of the determination processing of step S306, the road type recognition unit 120 determines whether or not the roadway score Sr is greater than or equal to the first threshold value Th1 (step S308). When it is determined that the roadway score Sr is greater than or equal to the first threshold value Th1, the road type recognition unit 120 recognizes that the mobile object 1 is moving on the roadway (step S310). When the roadway score Sr is less than the first threshold value Th1, strictly speaking, it is not recognized with a sufficient degree of confidence whether the mobile object 1 is moving on the roadway or the sidewalk, but the road type recognition unit 120 recognizes that the mobile object 1 is moving on the sidewalk in consideration of safety aspects (step S312).

The physical object recognition unit 130 recognizes a physical object located near the mobile object 1 on the basis of an output of the external environment detection device 10. Physical objects include some or all of mobile objects such as a vehicle, a bicycle, and a pedestrian, course boundaries such as a road marking, a step, a guardrail, a road shoulder, a median strip, structures installed on the road such as a road sign and a signboard, and an obstacle such as a falling object located (having fallen) on the course. For example, the physical object recognition unit 130 acquires information such as the presence, position, and type of another mobile object when an image captured by the external camera of the external environment detection device 10 is input to a trained model that has been trained to output information such as the presence, position, and type of a physical object if the image captured by the external camera is input. A type of the other mobile object can also be estimated on the basis of a size in the image and/or the intensity of reflected waves received by the radar device of the external environment detection device 10. Moreover, the physical object recognition unit 130 acquires, for example, the speed of another mobile object detected by the radar device using a Doppler shift or the like.

The control unit 140 controls, for example, the drive device 40 in accordance with a set driving mode. Also, the mobile object 1 may execute only some of the following driving modes, but the control unit 140 sets different speed limit values when the mobile object 1 moves on the roadway and when the mobile object 1 moves on the sidewalk in any case. In this case, the mode changeover switch 22 may be omitted.

In mode A-1, the control unit 140 controls the motor MT of the drive device 40 so that a distance from a physical object located in front of the mobile object 1 is maintained at a certain distance or more when the mobile object 1 moves on the roadway and the mobile object 1 moves at a first speed V1 when a distance from a physical object located in front of the mobile object 1 is sufficiently long with reference to information about a course and a physical object based on the output of the physical object recognition unit 130. The first speed V1 is, for example, a speed of 10 [km/h] or more and less than several tens of kilometers per hour [km/h], and is adjusted on the basis of a width of a course along which the mobile object 1 moves to be described below and the like. The control unit 140 controls the motor MT of the drive device 40 so that a distance from a physical object located in front of the mobile object 1 is maintained at a certain distance or more when the mobile object 1 moves on the sidewalk and the mobile object 1 moves at the second speed V2 (for example, a speed of less than 10 [km/h]) when a distance from a physical object located in front of the mobile object 1 is sufficiently long. This function is similar to an adaptive cruise control (ACC) function of a vehicle in which the first speed V1 or the second speed V2 is designated as the set speed and the technology used in ACC can be used. Moreover, in mode A-1, the control unit 140 controls the steering device SD so that a steering angle of the steered wheel is changed on the basis of a manipulation quantity of the manipulation element 14 such as the steering wheel. This function is similar to that of a power steering device and the technology used in the power steering device can be used. Also, electronic control is not performed in relation to steering and the mobile object 1 may include a steering device in which the manipulation element 14 and the steering mechanism are mechanically connected.

In mode A-2, the control unit 140 controls the steering device SD of the drive device 40 so that a target trajectory along which the mobile object 1 can move while avoiding a physical object within the course is generated with reference to information about the course and the physical object based on the output of the physical object recognition unit 130 and the mobile object 1 moves along the target trajectory. In relation to acceleration/deceleration, the control unit 140 controls the motor MT of the drive device 40 on the basis of the speed of the mobile object 1 and the manipulation quantity of the accelerator pedal or the brake pedal. The control unit 140 controls the motor MT of the drive device 40 in a state in which the first speed V1 is designated as the upper limit speed (wherein this control indicates that the mobile object 1 is not accelerated even if there is a further acceleration instruction when the mobile object 1 reaches the upper limit speed in the case of mode A-2) when the mobile object 1 is moving on the roadway and controls the drive device 40 in a state in which the second speed V2 is designated as the upper limit speed when the mobile object 1 is moving on the sidewalk.

In mode B, the control unit 140 controls the motor MT of the drive device 40 on the basis of the speed of the mobile object 1 and the manipulation quantity of the accelerator pedal or brake pedal. The control unit 140 controls the motor MT of the drive device 40 in a state in which the first speed V1 is designated as the upper limit speed (wherein this control indicates that the mobile object 1 is not accelerated even if there is a further acceleration instruction when the mobile object 1 reaches the upper limit speed in the case of mode B) when the mobile object 1 is moving on the roadway and controls the motor MT of the drive device 40 in a state in which the second speed V2 is designated as the upper limit speed when the mobile object 1 is moving on the sidewalk. In relation to steering, mode B is similar to mode A-1.

In mode C, the control unit 140 controls the drive device 40 so that a target trajectory along which the mobile object 1 can move while avoiding a physical object within the course is generated with reference to information about the course and the physical object based on the output of the physical object recognition unit 130 and the mobile object 1 moves along the target trajectory. Even in mode C, the control unit 140 controls the drive device 40 in a state in which the first speed V1 is designated as the upper limit speed when the mobile object 1 is moving on the roadway and controls the drive device 40 in a state in which the second speed V2 is designated as the upper limit speed when the mobile object 1 is moving on the sidewalk.

[Speed Adjustment]

Hereinafter, a process of adjusting the first speed V1 executed by the control unit 140 will be described. The control unit 140 adjusts the first speed V1 on the basis of a width of a course along which the mobile object 1 moves and the like. The course is a region sandwiched between course boundaries such as road markings, steps, guardrails, shoulders, and median strips. When the mobile object 1 is moving on a roadway of a multi-lane road, the course may indicate one lane or a one-sided road including a plurality of lanes.

The control unit 140, for example, decides the first speed V1 by making an adjustment for subtracting a correction value ΔV1-1 from an upper limit value V1max of the first speed V1. FIG. 7 is a diagram showing an example of a relationship between a width W of a course and the correction value ΔV1-1. Related information is stored in the storage device 70 as a part of a program for defining the control unit 140 or as table information to be referred to by the program. The control unit 140 increases the correction value ΔV1-1 as the width W of the course becomes small (narrow). Also, exemplified numerical values are only simple examples and do not define the invention. Moreover, instead of deciding the first speed V1 by subtracting the correction value ΔV1-1 from the upper limit value V1max of the first speed V1, the first speed V1 may be decided by multiplying the upper limit value V1max of the first speed V1 by a coefficient γ-1 of less than 1. In this case, "increase the correction value ΔV1-1" may be replaced with "decrease the coefficient γ-1."

By adjusting the first speed V1 in this way, it is possible to appropriately perform speed control in a mobile object capable of moving on the roadway and the sidewalk. A small width W of the course indicates a high probability that the roadway and sidewalk are separated only by the road marking, the width of the sidewalk is narrowed, or the legal speed is relatively low. In this case, it is preferable to move by appropriately limiting the first speed V1.

Moreover, the control unit 140 may adjust the first speed V1 on the basis of the roadway score Sc calculated by the road type recognition unit 120. For example, the control unit 140 sets the first speed V1 to a higher speed when the roadway score is higher. In this case, the control unit 140, for example, decides the first speed V1 by further performing an adjustment process of subtracting a correction value ΔV1-2, which becomes a larger value when the roadway score is lower, from the first speed V1 for which the above-described adjustment has been made. FIG. 8 is a diagram showing an example of a relationship between the roadway score Sc and the correction value ΔV1-2. Here, it is assumed that the roadway score is calculated in a range of 0 to 100 and a threshold value Th is 60. Related information is stored in the storage device 70 as a part of a program for defining the control unit 140 or as table information to be referred to by the program. Also, exemplified numerical values are only simple examples and do not define the invention.

By adjusting the first speed V1 in this way, it is possible to appropriately perform speed control in the mobile object capable of moving on the roadway and the sidewalk. The low roadway score Sc indicates that a probability of the mobile object 1 moving on the roadway is relatively low even within a range in which it is recognized that the mobile object 1 is moving on the roadway. In this case, it is preferable to move by appropriately limiting the first speed V1.

Although the case where the first speed V1 is decided by decreasing the value on the basis of various events in a state in which the upper limit value V1max of the first speed V1 is exclusively designated as a reference has been described above, a process of increasing the first speed V1 according to a condition may be performed.

Figure 9:
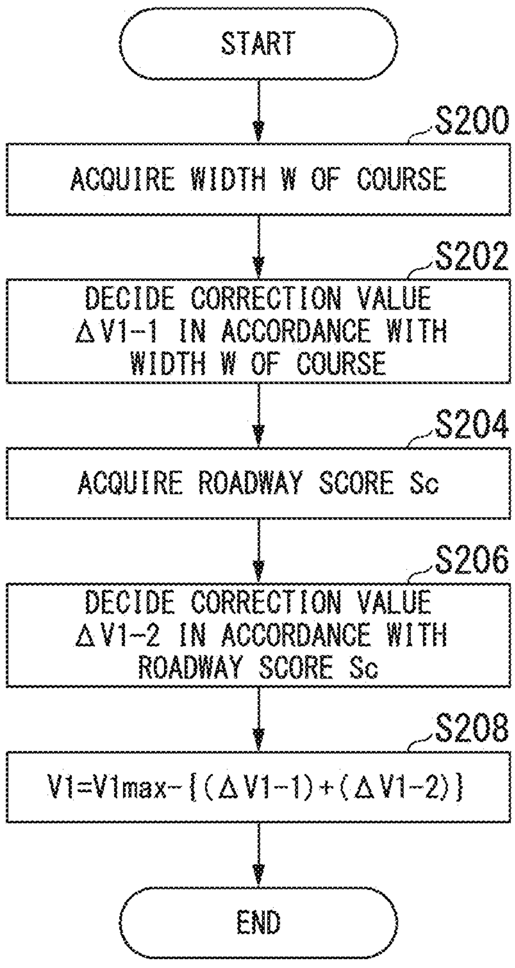
FIG. 9 is a flowchart showing an example of a flow of a process executed by a control unit 140 of the embodiment.

FIG. 9 is a flowchart showing an example of a flow of a process executed by the control unit 140 of the embodiment. The process of the flowchart is executed when the road type recognition unit 120 recognizes that the mobile object 1 is moving on the roadway. First, the control unit 140 acquires a width W of a course from the road type recognition unit 120 or the physical object recognition unit 130 (step S200) and decides a correction value ΔV1-1 in accordance with the width W of the course (step S202).

Subsequently, the control unit 140 acquires a roadway score Sc from the road type recognition unit (step S204) and decides a correction value ΔV1-2 in accordance with the roadway score Sc (step S206).

Also, the control unit 140 decides a first speed V1 by subtracting the correction value ΔV1-1 and the correction value ΔV1-2 from an upper limit value V1max of the first speed V1 (step S208).

Also, the control unit 140 may selectively perform either correction based on the width W of the course or correction based on the roadway score Sc. In this case, the control unit 140 may perform correction in which the upper limit value V1max of the first speed V1 is smaller. That is, the control unit 140 may compare the correction value ΔV1-1 that is an adjustment quantity of the first speed V1 based on the width W of the course and the correction value ΔV1-2 that is an adjustment quantity of the first speed based on the roadway score Sc, decide the first speed V1 by subtracting only the correction value ΔV1-1 from the upper limit value V1max of the first speed V1 when the correction value ΔV1-1 is greater than the correction value ΔV1-2, and decide the first speed V1 by subtracting only the correction value ΔV1-2 from the upper limit value V1max of the first speed V1 when the correction value ΔV1-1 is less than or equal to the correction value ΔV1-2. Thereby, the mobile object 1 can be moved at an appropriate speed without excessively reducing the speed.

According to the embodiment described above, it is possible to appropriately perform speed control in a mobile object capable of moving on a roadway or in a predetermined region different from the roadway.

<Modified Example>

Hereinafter, a modified example of the embodiment will be described. In the above-described embodiment, it is recognized that the mobile object 1 is moving on the sidewalk when a second event has been recognized. However, in the modified example, exception processing is performed when the second event is recognized and a roadway score Sr is greater than or equal to a second threshold value Th2 (Th1<Th2).

When the second event is recognized and the roadway score Sr is greater than or equal to the second threshold value Th2, this is a case where one or more second events have been recognized regardless of the fact that it is determined that there is a high probability that the mobile object 1 is moving on the roadway because the roadway score Sr has reached a large value. In this case, the recognition of the second event is likely to be due to the misrecognition of the second event, the accidental placement of a static obstacle on the roadway, or the roadway located on the upper side of the step due to an irregular road structure.

Therefore, in this case, a road type recognition unit 120 may perform the following exception processing without immediately determining that the mobile object 1 is moving on the sidewalk.

For example, the exception processing is processing (1) in which a previous recognition result continues for a certain period of time if the recognition result indicates that "the mobile object 1 is moving on the roadway" and it is recognized that the mobile object 1 is moving on the sidewalk if the previous recognition result indicates that "the mobile object 1 is moving on the sidewalk." Also, when a state in which "the second event is recognized and the roadway score Sr is greater than or equal to the second threshold value Th2" still continues after a certain period of time, the road type recognition unit 120 may recognize that the mobile object 1 is moving on the sidewalk.

Moreover, the exception processing may be processing (2) for outputting information for asking the occupant P of the mobile object 1 about a type in which the mobile object 1 is moving on the roadway or the sidewalk and recognizing whether the mobile object 1 is moving on the roadway or the sidewalk on the basis of a response of the occupant P. In this case, the response of the occupant P may be performed, for example, via a road type input switch (not shown) provided on the mobile object 1, or by voice.

The embodiment described above can be represented as follows.

A mobile object control device including:

a storage medium storing computer-readable instructions; and a processor connected to the storage medium, the processor executing the computer-readable instructions to:

recognize whether a mobile object capable of moving both on a roadway and in a predetermined region different from the roadway is moving on the roadway or in the predetermined region on the basis of an output of an external environment detection device configured to detect an external situation of the mobile object; and limit a speed of a case where the mobile object moves on the roadway to a first speed and limit a speed of a case where the mobile object moves in the predetermined region to a second speed lower than the first speed, wherein limiting the speed of the case where the mobile object moves on the roadway to the first speed includes adjusting the first speed on the basis of a width of a course along which the mobile object moves.

Although modes for carrying out the present invention have been described above using embodiments, the present invention is not limited to the embodiments and various modifications and substitutions can also be made without departing from the scope and spirit of the present invention.

REFERENCE SIGNS LIST

10 External environment detection device
12 Mobile object sensor
14 Manipulation element
16 Internal camera
18 Positioning device
22 Mode changeover switch
30 Moving mechanism
40 Drive device
50 External notification device
70 Storage device
100 Control device
120 Road type recognition unit
130 Physical object recognition unit
140 Control unit

What is claim is:

1. A mobile object control device for controlling a mobile object capable of moving both on a roadway and in a predetermined region different from the roadway, the mobile object control device comprising:

a processor configured to:

recognize whether the mobile object is moving on the roadway or in the predetermined region on the basis of an output of a sensor configured to detect an external situation of the mobile object;

limit a speed of a case where the mobile object moves on the roadway to a first speed;

limit a speed of a case where the mobile object moves in the predetermined region to a second speed lower than the first speed;

adjust the first speed on the basis of a width of a course along which the mobile object moves;

recognize whether the mobile object is moving on the roadway or in the predetermined region on the basis of a roadway score indicating a probability of the mobile object moving on the roadway calculated on the basis of the output of the external environment detection device; and adjust the first speed on the basis of the roadway score.

2. The mobile object control device according to claim 1, wherein the processor is configured to the first speed to a higher speed when the roadway score is higher.

3. The mobile object control device according to claim 1, wherein the processor is configured to:

compare an adjustment quantity of the first speed based on the width of the course with an adjustment quantity of the first speed based on the roadway score, adjust the first speed on the basis of the width of the course when the adjustment quantity of the first speed based on the width of the course is greater than an adjustment quantity of the first speed based on the roadway score, and adjust the first speed on the basis of the roadway score when the adjustment quantity of the first speed based on the width of the course is less than or equal to the adjustment quantity of the first speed based on the roadway score.

4. A mobile object control method comprising:

recognizing, by a computer for controlling a mobile object capable of moving both on a roadway and in a predetermined region different from the roadway, whether the mobile object is moving on the roadway or in the predetermined region on the basis of an output of a sensor configured to detect an external situation of the mobile object;

limiting, by the computer, a speed of a case where the mobile object moves on the roadway to a first speed;

limiting, by the computer, a speed of a case where the mobile object moves in the predetermined region to a second speed lower than the first speed;

adjusting, by the computer, the first speed on the basis of a width of a course along which the mobile object moves;

recognizing, by the computer, whether the mobile object is moving on the roadway or in the predetermined region on the basis of a roadway score indicating a probability of the mobile object moving on the roadway calculated on the basis of the output of the external environment detection device; and adjusting, by the computer, the first speed on the basis of the roadway score.

5. A non-transitory storage medium storing a program for causing a computer for controlling a mobile object capable of moving both on a roadway and in a predetermined region different from the roadway to:

recognize whether the mobile object is moving on the roadway or in the predetermined region on the basis of a sensor configured to detect an external situation of the mobile object;

limit a speed of a case where the mobile object moves on the roadway to a first speed;

limit a speed of a case where the mobile object moves in the predetermined region to a second speed lower than the first speed;

adjust the first speed on the basis of a width of a course along which the mobile object moves;

recognize whether the mobile object is moving on the roadway or in the predetermined region on the basis of a roadway score indicating a probability of the mobile object moving on the roadway calculated on the basis of the output of the external environment detection device; and adjust the first speed on the basis of the roadway score.

* * * * *